(12) United States Patent
Glenn

(10) Patent No.: US 7,688,362 B2
(45) Date of Patent: Mar. 30, 2010

(54) SINGLE SENSOR PROCESSING TO OBTAIN HIGH RESOLUTION COLOR COMPONENT SIGNALS

(75) Inventor: William E. Glenn, Ft. Lauderdale, FL (US)

(73) Assignee: Florida Atlantic University, Boca Raton, FL (US)

( * ) Notice: Subject to any disclaimer, the term of this patent is extended or adjusted under 35 U.S.C. 154(b) by 1354 days.

(21) Appl. No.: 11/074,305

(22) Filed: Mar. 7, 2005

(65) Prior Publication Data

US 2005/0212924 A1 Sep. 29, 2005

Related U.S. Application Data

(60) Provisional application No. 60/551,521, filed on Mar. 5, 2004.

(51) Int. Cl.
*H04N 9/68* (2006.01)
*H04N 3/14* (2006.01)

(52) U.S. Cl. ............... 348/235; 348/222.1; 348/237; 348/273; 348/280

(58) Field of Classification Search ............ 348/207.99, 348/234–238, 272–273, 277, 280; 358/518–520; 382/162, 167
See application file for complete search history.

(56) References Cited

U.S. PATENT DOCUMENTS

| | | | | | |
|---|---|---|---|---|---|
| 3,971,065 | A | * | 7/1976 | Bayer | 348/276 |
| 4,121,244 | A | * | 10/1978 | Nakabe et al. | 348/276 |
| 4,812,903 | A | * | 3/1989 | Wagensonner et al. | 358/521 |
| 4,899,213 | A | * | 2/1990 | Konishi et al. | 348/237 |
| 4,903,122 | A | * | 2/1990 | Ozaki et al. | 348/237 |
| 5,045,928 | A | * | 9/1991 | Takaiwa et al. | 348/227.1 |
| 5,436,662 | A | * | 7/1995 | Nagasaki et al. | 348/312 |
| 5,798,795 | A | | 8/1998 | Glenn et al. | 348/398 |
| 5,978,023 | A | | 11/1999 | Glenn | 348/368 |
| 6,101,271 | A | * | 8/2000 | Yamashita et al. | 382/167 |
| 6,147,707 | A | * | 11/2000 | Terasawa et al. | 348/229.1 |
| 6,208,382 | B1 | * | 3/2001 | Glenn | 348/448 |
| 6,266,093 | B1 | * | 7/2001 | Glenn | 348/448 |

(Continued)

FOREIGN PATENT DOCUMENTS

JP 55075387 A * 6/1980

(Continued)

OTHER PUBLICATIONS

W.E. Glenn, "A 1920×1080 60P System Compatible With a 1920×1080 30I Format", SMPTE Journal, Jul./Aug. 2002.

*Primary Examiner*—Ngoc-Yen T Vu
(74) *Attorney, Agent, or Firm*—Martin Novack

(57) ABSTRACT

A method for generating color video signals representative of color images of a scene includes the following steps: focusing light from the scene on an electronic image sensor via a filter having a tri-color filter pattern; producing, from outputs of the sensor, first and second relatively low resolution luminance signals; producing, from outputs of the sensor, a relatively high resolution luminance signal; producing, from a ratio of the relatively high resolution luminance signal to the first relatively low resolution luminance signal, a high band luminance component signal; producing, from outputs of the sensor, relatively low resolution color component signals; and combining each of the relatively low resolution color component signals with the high band luminance component signal to obtain relatively high resolution color component signals.

24 Claims, 4 Drawing Sheets

U.S. PATENT DOCUMENTS

| | | | |
|---|---|---|---|
| 6,570,616 B1 * | 5/2003 | Chen | 348/272 |
| 6,614,471 B1 * | 9/2003 | Ott | 348/238 |
| 6,778,220 B2 | 8/2004 | Glenn | 348/368 |
| 6,847,397 B1 * | 1/2005 | Osada | 348/273 |
| 6,882,364 B1 * | 4/2005 | Inuiya et al. | 348/252 |
| 6,891,568 B1 | 5/2005 | Glenn | 348/262 |
| 7,082,218 B2 * | 7/2006 | Pollard et al. | 382/167 |
| 7,230,646 B2 * | 6/2007 | Glenn | 348/315 |

FOREIGN PATENT DOCUMENTS

| | | | |
|---|---|---|---|
| JP | 07-038915 | * | 2/1995 |
| JP | 07038915 A | * | 2/1995 |

* cited by examiner

SINGLE SENSOR PROCESSING TO OBTAIN HIGH RESOLUTION COLOR COMPONENT SIGNALS

RELATED APPLICATION

The present application claims priority from U.S. Provisional Patent Application Ser. 60/551,521, filed Mar. 5, 2004, and said Provisional Patent Application is incorporated herein by reference.

GOVERNMENT RIGHTS

This invention was made with Government support under NASA Contract NCC8-272. The Government has certain rights in the invention.

FIELD OF THE INVENTION

This invention relates to color video camera processing and, more particularly, to a method and apparatus for obtaining improved color video images from single sensor video cameras that use a tricolor filter.

BACKGROUND OF THE INVENTION

Single sensor color video cameras typically utilize a color filter to separate the color components of an image. The pixels or pixel regions on the sensor (for example a CCD or CMOS chip) are read out, or scanned out, to produce video color component signals from the pixels or pixel regions associated with respective colors, for example, green, red, and blue stripe regions or checkerboard regions on the sensor that receive the corresponding filtered light of the image. In this manner, color separation can be achieved.

One type of filter, which has advantages for single sensor operation is a so-called Bayer pattern filter, illustrated in FIG. 1. This filter has a checkerboard type of pattern with green filter regions arranged diagonally as every other square on every line. The red and blue filter regions alternate on the diagonals and are present as every other square on every other line. In another possible arrangement, the green squares are instead white, with green being derived from luminance and the other colors.

As seen in FIG. 1, only half of the total filter regions pass green, only one quarter of the total filter regions pass red, and only one quarter of the total filter regions pass blue. As in other single sensor color systems, there are trade-offs between the need to separate colors, and the desire to also achieve reasonable good resolution in color, notwithstanding the fact that, after filtering, only a fraction of the light of each color is actually incident on the sensor surface.

It is among the objects of the present invention to improve performance of single sensor video cameras by processing to enhance perceived color resolution.

SUMMARY OF THE INVENTION

In embodiments of the present invention, isoluminant color is used to get full resolution RGB for saturated colors, and improved resolution for changes in color. In embodiments hereof, the processing uses to advantage the fact that the green primary has so much red and blue cross talk, that it is close to photopic luminance.

In accordance with an embodiment of the method of the invention, there is disclosed a method for generating color video signals representative of color images of a scene, including the following steps: focusing light from the scene on an electronic image sensor via a filter having a tri-color filter pattern; producing, from outputs of the sensor, first and second relatively low resolution luminance signals; producing, from outputs of the sensor, a relatively high resolution luminance signal; producing, from a ratio of the relatively high resolution luminance signal to the first relatively low resolution luminance signal, a high band luminance component signal; producing, from outputs of the sensor, relatively low resolution color component signals; and combining each of the relatively low resolution color component signals with the high band luminance component signal to obtain relatively high resolution color component signals.

In an illustrated embodiment of the invention, the filter has a green-red-blue Bayer filter pattern.

In a preferred embodiment of the invention, the step of producing, from outputs of the sensor, first and second relatively low resolution luminance signals, includes producing first and second green color signals from outputs of the sensor, and modifying the first and second green color signals with adjacent red and blue signals from outputs of the sensor, to produce the first and second low resolution luminance signals. Also in this embodiment, the first and second low resolution luminance signals comprise luminance signals derived respectively from green pixels on odd lines of outputs of the sensor and from green pixels on even lines of outputs of the sensor. Also in this embodiment, The step of producing, from outputs of the sensor, a relatively high resolution luminance signal, comprises combining the first and second low resolution luminance signals and producing a scan-converted relatively high resolution luminance signal. Also in this embodiment, the step of producing, from outputs of the sensor, relatively low resolution color component signals, includes producing from outputs of the sensor, and the first relatively low resolution luminance signal, scan converted relatively low resolution color component signals. Also in this embodiment, the step of combining each of the relatively low resolution color component signals with the high band luminance component signal to obtain relatively high resolution color component signals includes combining each of the scan converted relatively low resolution color component signals with the high band luminance component signal.

In another preferred embodiment of the invention the high band luminance component signal is of the form $(Y_H/Y_L)$, and step of combining each of the scan converted relatively low resolution color component signals with the high band luminance component signal to obtain relatively high resolution green, red, and blue color component signals comprises deriving signals of the form $\log G\ (Y_H/Y_L)$, $\log R\ (Y_H/Y_L)$, and $\log B\ (Y_H/Y_L)$.

Further features and advantages of the invention will become more readily apparent from the following detailed description when taken in conjunction with the accompanying drawings.

DETAILED DESCRIPTION

Figure 1:
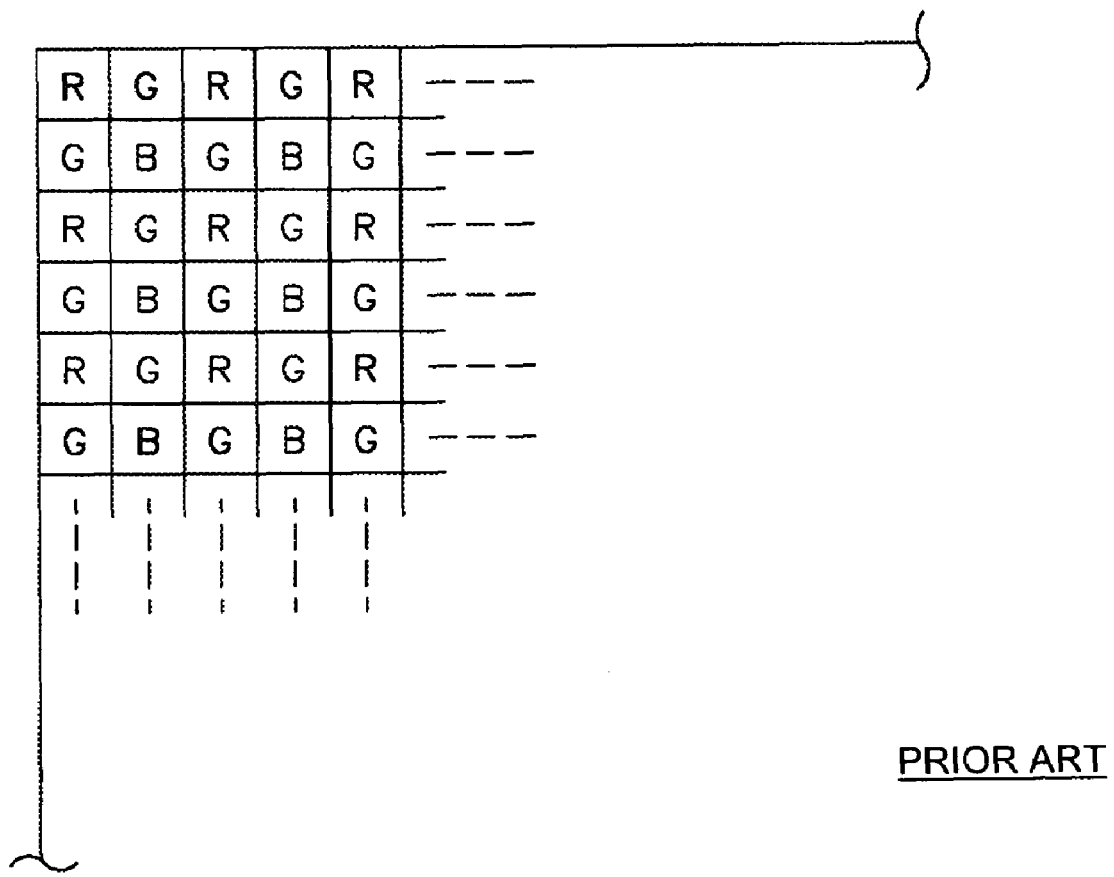
FIG. 1 is a diagram of a Bayer pattern color filter that can be employed in embodiments of the invention.
Figure 2:
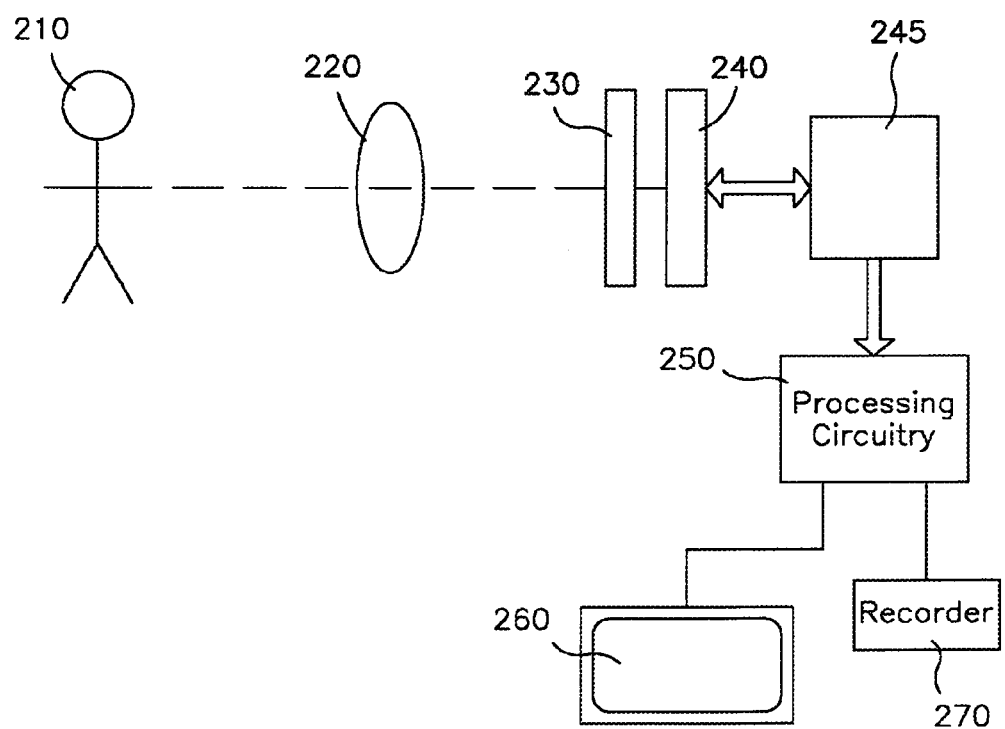
FIG. 2 is block diagram of a camera system in accordance with an embodiment of the invention, and which can be used in practicing the method of the invention.

Referring to FIG. 2, there is shown a block diagram of a video camera system 200 in accordance with an embodiment of the apparatus of the invention and which can be used in practicing an embodiment of the method of the invention. Light received from a scene 210 being viewed (i.e., a scene which can be moving) is focused by a camera lens system 220 through a color filter 230 onto an image sensor 240. In the present embodiment, the color filter 230 is a Bayer pattern filter, as in FIG. 1, and the image sensor may be, for example, a 3840×2160 CMOS of a type used for high definition video applications, although it will be understood that the principles of the invention are applicable to any suitable type of image sensor. The sensor output is scanned by circuit 245, which produces as outputs, the raw color signals 245A which are coupled with processing circuitry 250 in accordance with embodiments of the invention, and which is shown in further detail in FIGS. 3 and 4. The processed video signals can ultimately be displayed on any suitable display 260, such as a high definition television display 260, and/or recorded on recorder 270.

Figure 3:
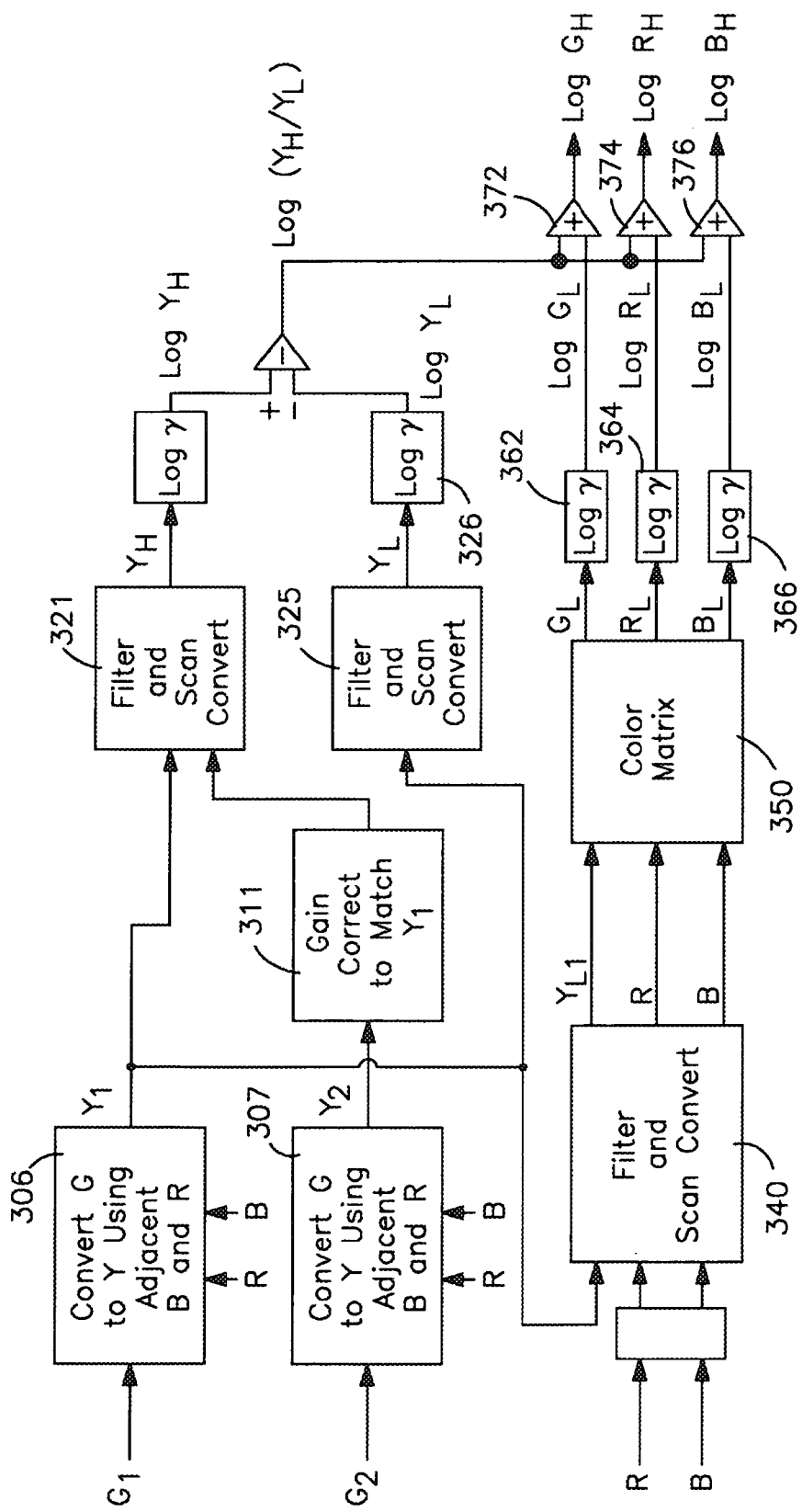
FIG. 3 is a block diagram of the processing circuitry of FIG. 2 in accordance with an embodiment of the invention, and which can be used in practicing the method of the invention.

FIG. 3 is a block diagram of an embodiment of the processing circuitry 250 of FIG. 2, the green color signal corresponding to every other pixel on the odd lines of the Bayer pattern, and designated $G_1$, is coupled to block 306, and the green color signal corresponding to every other pixel on the even lines of the Bayer pattern, and designated $G_2$, is coupled to block 307. Both of these are at 1920×1080 pixels in the present example. Each of these blocks 306, 307 also receives the red color and blue color signals, and operates to convert green (G) to luminance (Y) by combining appropriate fractions of adjacent red (R) and blue (B) for each pixel. The results are designated $Y_1$ and $Y_2$. The $Y_2$ signal is gain corrected to correct for crosstalk, as represented by the block 311, and $Y_1$ and $Y_2$ are coupled to block 321 which operates to filter, combine, and interpolate to obtain a scan-converted 3840×2160 luminance, which is relatively high resolution luminance signal designated $Y_H$. One of the luminance components ($Y_1$ in this example) is also filtered and interpolated, as represented by block 325, to obtain a scan-converted 3840×2160 luminance, which is a relatively low resolution luminance signal with an increased number of pixels, and designated $Y_L$. In the present embodiment, log gamma circuits 322 and 326 are used to derive log $Y_H$ and log $Y_L$, and these logs are subtracted, as represented by block 330, to obtain the signal log ($Y_H/Y_L$).

The signal $Y_1$ is also one input to the block 340, which also receives, via aligning delays 339, the red color signal corresponding to every other pixel on the odd lines and the blue color signal corresponding to every other pixel on the even lines. In the present example, these red and blue signals are at 1920×1080 pixels. The scan conversion of block 340, which, as in all scan conversions hereof, can employ interpolation with any desired number of taps, increases the number of pixels of the signals to 3840×2160. It will be understood that the scan conversion can include any necessary position adjustment. The outputs of block 340, designated $Y_{L1}$, R, and B, are input to color matrix 350 which is operative to convert the relatively low resolution Y to green by subtracting out appropriate portions of the red and blue components. The outputs of matrix 350 are relatively low resolution color component signals (at a relatively low resolution, but with pixel count increased to 3840×2160), designated $G_L$, $R_L$ and $B_L$, and are respectively coupled to log gamma circuits 362, 364, and 366. The outputs of the log gamma circuits, respectively designated as log $G_L$, log $R_L$, and log $B_L$, are added, by summing circuits 372, 374 and 376, to the high resolution component log ($Y_H/Y_L$), to obtain gamma corrected relatively high resolution color components $G_H$, $R_H$, and $B_H$. In the present example, the output color component signals are at a resolution of 3840×2160 for saturated colors and 1920× 1080 for changes in color. It can be noted that, if desired, the implemented ratios (difference of logs) and products (sums of logs) can be achieved using, for example, digital ratios and products (such as can be implemented using field programmable gate arrays) to generate outputs that can then be gamma corrected. However, one of the advantages of the illustrated processing is that the output component signals are already gamma correlated.

Figure 4:
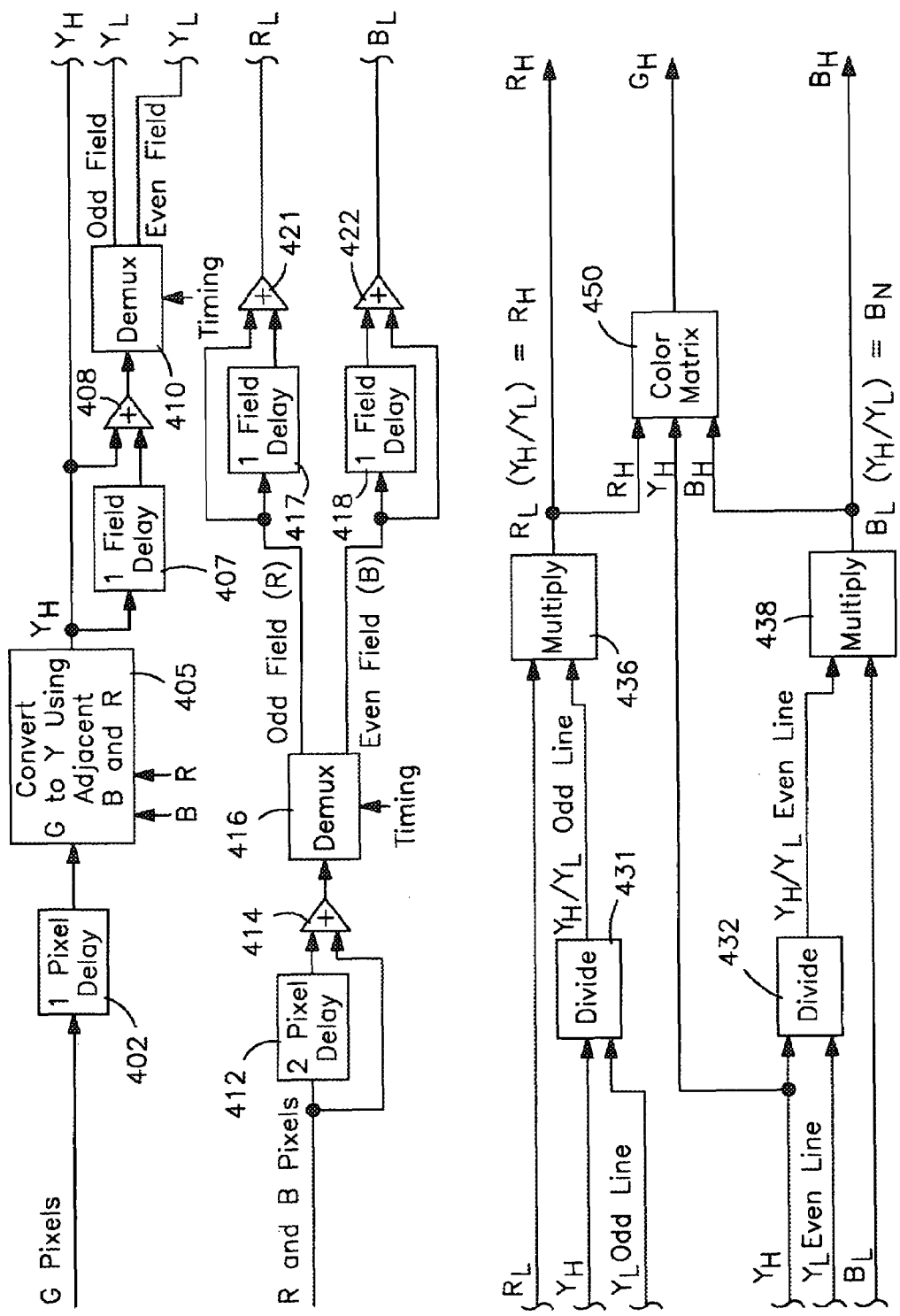
FIG. 4 is a block diagram of the processing circuitry of FIG. 2 in accordance with another embodiment of the invention, and which can be used in practicing the method of the invention.

FIG. 4 is a block diagram of a further embodiment which implements processing sequentially, rather than simultaneously as in FIG. 3. In the example of FIG. 4, the output of block 245 of FIG. 2 comprises interlaced fields from the sensor used in conjunction with the Bayer pattern color filter. In FIG. 4, the signals from the green pixels (that is, the sensor regions corresponding to the green filter areas) are coupled, via a one pixel delay 402, to a block 405, which is similar to the blocks 306 and 307 of FIG. 3. In particular, the block 405 operates to correct G to Y, based on the adjacent R and B, and implements any necessary gain correction, in this case at the field rate. The output is designated $Y_H$. The signal $Y_H$, and the one field delayed version thereof (from block 407) are summed by summing circuit 408, and then input to demultiplexer 410, which receives the video timing signals and produces the separated relating lower resolution odd field, $Y_{L1}$, and even field, $Y_{L2}$.

The signals representing the red and blue pixels of the Bayer pattern are input to a two pixel delay 412 and the output thereof is summed with the input signal by a summing circuit 414, and the sum is demultiplexed by demultiplexer 416, to produce odd field red and even field blue signals. The two pixel delay averaging aligns the red and blue pixel signals with the green. The outputs of demultiplexer 416 are respectively coupled to circuits that include a one field delay (blocks 417 and 418) and a summing circuit (blocks 421 and 422). These circuits are operative to repeat the field so that the red signal, designated $R_L$ and the blue signal, designated $B_L$, are present during both fields.

Referring next to the lower portion of the diagram, a divider circuit 431 receives the signal $Y_H$ and the signal $Y_L$ for the odd lines and produces $Y_H/Y_L$ for the odd lines, which is multiplied (multiplier circuit 436) by the red signal $R_L$. The result is a high resolution red color signal $R_H$, equal to $R_L$ ($Y_H/Y_L$). Similarly, a divider circuit 432 receives the signal $Y_H$ and the signal $Y_L$ for the even lines and produces $Y_H/Y_L$ for the even lines, which is multiplied (multiplier circuit 438) by the red signal $R_L$. The result is a high resolution red color signal $B_H$, equal to $B_L$ ($Y_H/Y_L$). A color matrix 450 operates in similar manner to the color matrix 350 of the FIG. 3 embodiment; namely, it receives $Y_H$, $R_H$ and $B_H$ and operates to subtract out the red and blue components from $Y_H$ to produce the high band green color signal, $G_H$.

The invention has been described with reference to particular preferred embodiments, but variations within the spirit and scope of the invention will occur to those skilled in the art. For example, if the image sensor is upgraded to operate at a higher frame rate, the exemplary embodiments will produce signals at proportionally higher rates. Also, while green, red and blue, are preferred filter colors, it will be understood that other combinations, for example subtractive colors, could be used.

The invention claimed is:

1. A method for generating color video signals representative of color images of a scene, comprising the steps of:
   focusing light from said scene on an electronic image sensor via a filter having a tri-color filter pattern;
   producing, from outputs of said sensor, first and second relatively low resolution luminance signals;
   producing, from outputs of said sensor, a relatively high resolution luminance signal, by interpolating said first and second low resolution luminance signals to obtain a scan-converted relatively high resolution luminance signal;
   producing, from a ratio of said relatively high resolution luminance signal to said first relatively low resolution luminance signal, a high band luminance component signal;
   producing, from outputs of said sensor, relatively low resolution color component signals; and
   combining each of said relatively low resolution color component signals with said high band luminance component signal to obtain relatively high resolution color component signals.

2. The method as defined by claim 1, wherein said step of focusing light from said scene on an electronic image sensor via a filter having a tri-color filter pattern comprises focusing light from said scene on an electronic image sensor via a filter having a green-red-blue filter pattern.

3. The method as defined by claim 2, wherein said step of producing, from outputs of said sensor, first and second relatively low resolution luminance signals, includes producing first and second green color signals from outputs of said sensor, and modifying said first and second green color signals with adjacent red and blue signals from outputs of said sensor, to produce said first and second low resolution luminance signals.

4. The method as defined by claim 3, wherein said first and second low resolution luminance signals comprise luminance signals derived respectively from green pixels on odd lines of outputs of said sensor and from green pixels on even lines of outputs of said sensor.

5. The method as defined by claim 2, wherein said first and second low resolution luminance signals comprise luminance signals derived respectively from green pixels on odd lines of outputs of said sensor and from green pixels on even lines of outputs of said sensor.

6. The method as defined by claim 2, wherein said step of producing, from outputs of said sensor, relatively low resolution color component signals, includes producing from outputs of said sensor, and said first relatively low resolution luminance signal, scan converted relatively low resolution color component signals.

7. The method as defined by claim 1, wherein said step of focusing light from said scene on an electronic image sensor via a filter having a tri-color filter pattern comprises focusing light from said scene on an electronic image sensor via a filter having a green-red-blue Bayer filter pattern.

8. The method as defined by claim 7, wherein said step of producing, from outputs of said sensor, first and second relatively low resolution luminance signals, includes producing first and second green color signals from outputs of said sensor, and modifying said first and second green color signals with adjacent red and blue signals from outputs of said sensor, to produce said first and second low resolution luminance signals.

9. The method as defined by claim 8, wherein said first and second low resolution luminance signals comprise luminance signals derived respectively from green pixels on odd lines of outputs of said sensor and from green pixels on even lines of outputs of said sensor.

10. The method as defined by claim 8, wherein said step of producing, from outputs of said sensor, relatively low resolution color component signals, includes producing from outputs of said sensor, and said first relatively low resolution luminance signal, scan converted relatively low resolution color component signals.

11. The method as defined by claim 7, wherein said first and second low resolution luminance signals comprise luminance signals derived respectively from green pixels on odd lines of outputs of said sensor and from green pixels on even lines of outputs of said sensor.

12. The method as defined by claim 1, wherein said step of focusing light from said scene on an electronic image sensor via a filter having a tri-color filter pattern comprises focusing light from said scene on an electronic image sensor via a filter having a white-red-blue Bayer filter pattern.

13. The method as defined by claim 1, wherein said step of focusing light from said scene on an electronic image sensor via a filter having a tri-color filter pattern comprises focusing light from said scene on an electronic image sensor via a filter having a white-red-blue Bayer filter pattern.

14. A method for generating color video signals representative of color images of a scene, comprising the steps of:
   focusing light from said scene on an electronic image sensor via a filter having a tri-color filter pattern of green, red, and blue;
   producing, from green pixel outputs of said sensor, first and second relatively low resolution luminance signals;
   producing, from a combination of said first and second low resolution luminance signals, a scan-converted relatively high resolution luminance signal;
   producing, from a ratio of said relatively high resolution luminance signal to said first relatively low resolution luminance signal, a high band luminance component signal;
   producing, from outputs of said sensor and said first relatively low resolution luminance signal, scan converted relatively low resolution green, red and blue color component signals; and
   combining each of said scan converted relatively low resolution color component signals with said high band luminance component signal to obtain relatively high resolution green, red, and blue color component signals.

15. The method as defined by claim 14, wherein said step of focusing light from said scene on an electronic image sensor via a filter having a tri-color filter pattern of green, red, and blue, comprises focusing light from said scene on an electronic image sensor via a filter having a Bayer filter pattern.

16. The method as defined by claim 15, wherein said step of producing, from green pixel outputs of said sensor, first and second relatively low resolution luminance signals, includes producing first and second green color signals from outputs of said sensor, and modifying said first and second green color signals with adjacent red and blue signals from outputs of said sensor, to produce said first and second low resolution luminance signals.

17. The method as defined by claim 15, wherein said high band luminance component signal is of the form $(Y_H/Y_L)$, and wherein said step of combining each of said scan converted relatively low resolution color component signals with said high band luminance component signal to obtain relatively high resolution green, red, and blue color component signals comprises deriving signals of the form $\log(G(Y_H/Y_L))$, $\log(R(Y_H/Y_L))$, and $\log(B(Y_H/Y_L))$.

18. The method as defined by claim 15, wherein said step of producing, from a combination of said first and second low resolution luminance signals, a scan-converted relatively high resolution luminance signal, includes increasing the number of pixels of each of said first and second low resolution luminance signals, and wherein said step of producing, from outputs of said sensor and said first relatively low resolution luminance signal, scan converted relatively low resolution green, red and blue color component signals, includes increasing the number of pixels of each of said relatively low resolution color component signals.

19. The method as defined by claim 14, wherein said high band luminance component signal is of the form $(YH/Y_L)$, and wherein said step of combining each of said scan converted relatively low resolution color component signals with said high band luminance component signal to obtain relatively high resolution green, red, and blue color component signals comprises deriving signals of the form $\log(G(Y_H/Y_L))$, $\log(R(Y_H/Y_L))$, and $\log(B(Y_H/Y_L))$.

20. The method as defined by claim 14, wherein said step of producing, from a combination of said first and second low resolution luminance signals, a scan-converted relatively high resolution luminance signal, includes increasing the number of pixels of each of said first and second low resolution luminance signals, and wherein said step of producing, from outputs of said sensor and said first relatively low resolution luminance signal, scan converted relatively low resolution green, red and blue color component signals, includes increasing the number of pixels of each of said relatively low resolution color component signals.

21. Apparatus for generating color video signals representative of color images of a scene, comprising:
means for focusing light from said scene on an electronic image sensor via a filter having a tri-color filter pattern;
means for producing, from outputs of said sensor, first and second relatively low resolution luminance signals;
means for producing, from outputs of said sensor, a relatively high resolution luminance signal, comprising means for interpolating said first and second low resolution luminance signals to obtain a scan-converted relatively high resolution luminance signal;
means for producing, from a ratio of said relatively high resolution luminance signal to said first relatively low resolution luminance signal, a high band luminance component signal;
means for producing, from outputs of said sensor, relatively low resolution color component signals; and
means for combining each of said relatively low resolution color component signals with said high band luminance component signal to obtain relatively high resolution color component signals.

22. Apparatus as defined by claim 21 wherein said means for of focusing light from said scene on an electronic image sensor via a filter having a tri-color filter pattern comprises means for focusing light from said scene on an electronic image sensor via a filter having a green-red-blue Bayer filter pattern.

23. Apparatus as defined by claim 22, wherein said means for producing, from outputs of said sensor, first and second relatively low resolution luminance signals, includes means for producing first and second green color signals from outputs of said sensor, and means for modifying said first and second green color signals with adjacent red and blue signals from outputs of said sensor, to produce said first and second low resolution luminance signals.

24. Apparatus as defined by claim 23, wherein said means for producing, from outputs of said sensor, first and second low resolution luminance signals, comprises means for producing said first low resolution luminance signal from green pixels on odd lines of outputs of said sensors and producing said second low resolution luminance signal from green pixels on even lines of outputs of said sensors.

\* \* \* \* \*